US009613448B1

(12) United States Patent
Margolin

(10) Patent No.: US 9,613,448 B1
(45) Date of Patent: Apr. 4, 2017

(54) AUGMENTED DISPLAY OF INFORMATION IN A DEVICE VIEW OF A DISPLAY SCREEN

(71) Applicant: Google Inc., Mountain View, CA (US)

(72) Inventor: Benjamin Margolin, San Mateo, CA (US)

(73) Assignee: Google Inc., Mountain View, CA (US)

( * ) Notice: Subject to any disclaimer, the term of this patent is extended or adjusted under 35 U.S.C. 154(b) by 170 days.

(21) Appl. No.: 14/250,204

(22) Filed: Apr. 10, 2014

Related U.S. Application Data

(60) Provisional application No. 61/953,383, filed on Mar. 14, 2014.

(51) Int. Cl.
*H04N 7/18* (2006.01)
*G09G 5/00* (2006.01)
*G06T 11/60* (2006.01)
*G06T 11/00* (2006.01)

(52) U.S. Cl.
CPC ............ *G06T 11/60* (2013.01); *G06T 11/001* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 7,119,829 | B2 * | 10/2006 | Leonard | H04N 7/15 348/14.08 |
| 7,131,060 | B1 * | 10/2006 | Azuma | G06T 11/60 715/260 |
| 7,522,186 | B2 * | 4/2009 | Arpa | G06T 7/0024 348/143 |
| 8,400,548 | B2 | 3/2013 | Bilbrey et al. | |
| 8,542,906 | B1 * | 9/2013 | Persson | G06K 9/00671 382/103 |
| 8,640,956 | B2 * | 2/2014 | Gomez | H04N 21/4126 235/375 |

(Continued)

FOREIGN PATENT DOCUMENTS

WO    2013151193 A1    10/2013

OTHER PUBLICATIONS

Now you can transmit data to smart devices over inaudible soundwaves, Sarah Mitroff, Jan. 10, 2012 http://venturebeat.com/2012/01/10/sonic-notify/.*

(Continued)

*Primary Examiner* — Barry Drennan
*Assistant Examiner* — Jason Pringle-Parker
(74) *Attorney, Agent, or Firm* — IP Spring

(57) ABSTRACT

Implementations relate to augmented display of information in a device view of a display screen. In some implementations, a method includes detecting a physical display screen appearing in a field of view of an augmenting device, and detecting an information pattern in output associated with the physical display screen. The method extracts displayable information and screen position information from the information pattern, where the screen position information is associated with the displayable information and indicates a screen position on the physical display screen. The method causes a display of the displayable information overlaid in the field of view of the augmenting device, where the display of the displayable information is based on the screen position information.

19 Claims, 6 Drawing Sheets

(56) References Cited

U.S. PATENT DOCUMENTS

| | | | | |
|---|---|---|---|---|
| 8,711,176 | B2* | 4/2014 | Douris | G01C 21/3602 345/158 |
| 8,875,173 | B2* | 10/2014 | Kilaru | G06Q 30/0241 725/19 |
| 2002/0158873 | A1* | 10/2002 | Williamson | G06T 7/002 345/427 |
| 2004/0189675 | A1* | 9/2004 | Pretlove | B25J 9/1656 345/633 |
| 2010/0304788 | A1* | 12/2010 | Mun | H04M 1/72572 455/556.1 |
| 2011/0187743 | A1* | 8/2011 | Hwang | G06F 17/30047 345/633 |
| 2011/0216179 | A1* | 9/2011 | Dialameh | G06F 17/30247 348/62 |
| 2011/0242133 | A1* | 10/2011 | Greaves | G06F 17/30058 345/633 |
| 2011/0248995 | A1* | 10/2011 | Vaughan | G06K 9/44 345/420 |
| 2012/0019858 | A1* | 1/2012 | Sato | H04N 1/00344 358/1.15 |
| 2012/0022924 | A1* | 1/2012 | Runnels | G06F 3/011 705/14.4 |
| 2012/0072463 | A1* | 3/2012 | Moganti | G06Q 30/0276 707/803 |
| 2012/0127284 | A1 | 5/2012 | Bar-Zeev et al. | |
| 2012/0327117 | A1 | 12/2012 | Weller et al. | |
| 2013/0288719 | A1* | 10/2013 | Alonzo | G01C 21/00 455/457 |
| 2014/0100996 | A1* | 4/2014 | Klein | G06T 1/00 705/27.2 |

OTHER PUBLICATIONS

Dean Takahashi et al, "Point this app at your TV screen and it overlays all kinds of augmented-reality goodies," http://venturebeat.com/, Jan. 8, 2013.

Michael Hines "Augmented Reality Television Apps," www.trendhunter.com, Aug. 12, 2010.

"Augmented Reality TV with TvTak," http://arnews.tv/, Accessed on Feb. 3, 2014.

Marshall Kirkpatrick "Augmented Reality Coming to Video Conferencing," http://readwrite.com/, Feb. 4, 2010.

* cited by examiner

AUGMENTED DISPLAY OF INFORMATION IN A DEVICE VIEW OF A DISPLAY SCREEN

BACKGROUND

Several types of display devices have become popular and convenient to use for a variety of applications, including viewing of media, video conferencing, etc. For example, display devices can be standalone devices, such as large display screens, or can be part of portable devices, such as touch-sensitive display screens on devices such as cell phones, personal digital assistants, watches, etc. Some display devices can be included in other types of devices, such as glasses or goggles worn by a user. In addition, some display devices can be used for augmented reality applications, in which generated graphical images can be superimposed on a view of real-life scenery or environment. For example, augmented reality graphics can be superimposed on the glass or lenses of display goggles, so that a user wearing the goggles sees both the augmented graphics as well as the real-life scene through the lenses. Or, a camera of a device can provide a view of a real-life scene displayed on a display screen, and generated augmented graphics can be superimposed on the display screen in this camera view.

SUMMARY

Implementations of the present application relate to augmented display of information in a device view of a display screen. In some implementations, a method includes detecting a physical display screen appearing in a field of view of an augmenting device, and detecting an information pattern in output associated with the physical display screen. The method extracts displayable information and screen position information from the information pattern, where the screen position information is associated with the displayable information and indicates a screen position on the physical display screen. The method causes a display of the displayable information overlaid in the field of view of the augmenting device, where the display of the displayable information is based on the screen position information.

Various implementations and examples of the method are described. For example, the augmenting device can include a wearable device or a handheld device and the displayable information can be displayed as augmented reality graphics overlaid in the field of view. The output associated with the display screen can be visual output and the information pattern can be a visual information pattern provided in the visual output. The output associated with the display screen can also or alternatively be audio output associated with visual output of the display screen, where the information pattern is an audio information pattern. Visual output of the display screen can depict one or more objects, and the displayable information can include descriptive information associated with the objects, such as identifying information indicating identities of the objects. The screen position information can be associated with at least one of the objects such that the displayable information is displayed as visually associated with the objects. In another example, the descriptive information can include one or more sets of descriptors, where each set is associated with a different object depicted on the screen and the screen position information includes positions on the screen associated with different sets of descriptors. The screen position information can include screen coordinates indicating a location on the display screen with reference to one or more display screen boundaries.

The method can further include detecting the physical display screen by detecting one or more highlight markers displayed in visual output of the screen, where the highlight markers highlight the visual output to assist the detection of the screen. The visual output can be a video stream displayed by the physical display screen, or an image displayed by the physical display screen. For example, the visual output can include a live video stream displayed by the physical display screen and the objects can be persons participating in a video conference. The method can receive additional displayable information via one or more signals, some of which can be separate from the visual output of the display screen. For example, the method can perform object recognition on objects depicted in the visual output, perform voice recognition on voices emitted by the objects and detected in audio output associated with the visual output, detect a signal from a device physically located on at least one of the objects, and/or examine calendar information associated with an identified physical location captured in the visual output and providing information associated with persons located at the physical location.

A method includes, in some implementations, detecting visual output of a physical display screen appearing in a field of view of an augmenting device, the visual output depicting one or more objects. The method detects a visual information pattern in the visual output, and extracts descriptive information from the information pattern, the descriptive information being associated with at least one of the objects depicted in the visual output. The method also extracts screen position information from the information pattern, the screen position information being associated with the descriptive information and indicating one or more screen positions on the physical display screen. The screen positions are associated with at least one of the objects. The method causes a display of the descriptive information overlaid in the field of view of augmenting device, where the display is based on the position of the display screen in the field of view and is based on the screen position information. The displayed descriptive information is visually associated with the associated objects.

In some implementations, a system can include a storage device and at least one processor accessing the storage device and operative to perform operations. The operations include detecting a physical display screen appearing in a field of view of an augmenting device, and detecting an information pattern in output associated with the physical display screen. The operations include extracting displayable information and screen position information from the information pattern, where the screen position information is associated with the displayable information and indicates a screen position on the physical display screen. The operations cause a display of the displayable information overlaid in the field of view of the augmenting device, where the display of the displayable information is based on the screen position information.

In various implementations of the system, the output associated with the display screen can be visual output and the information pattern can be a visual information pattern provided in the visual output, and/or the output can be audio output associated with visual output of the display screen and the information pattern can be an audio information pattern. The visual output of the display screen can depict one or more objects, and the displayable information can include descriptive information visually associated with at least one of the objects. Detecting a physical display screen can include detecting one or more highlight markers displayed in visual output of the screen, where the highlight markers highlight the visual output to assist the detection of the physical display screen in the field of view of the augmenting device.

DETAILED DESCRIPTION

One or more implementations described herein relate to augmented display of information in a device view of a display screen. A system can include an augmenting device, such as a wearable or handheld device able to display augmented reality graphics overlaid in the field of view of the device. The augmenting device can detect a physical display screen in its field of view and can extract displayable information and screen position information from an information pattern output in association with the display screen. For example, the information pattern can be included in the visual output of the screen (e.g., as an unobtrusive bar code or other pattern) or included in audio output (e.g., outside the normal range of hearing). The augmenting device can use the screen position information to assist in displaying the displayable information as overlaid information in its field of view relative to the display screen. For example, the overlaid information can be descriptive information visually associated with persons or other objects depicted on the display screen, such as names and job titles displayed during a video teleconference in one example.

Various features advantageously allow a user of an augmenting device to see helpful information such as names, titles, and other descriptors for persons and other objects displayed on a viewed display screen, such as in a video teleconference or video presentation. The information relayed to the augmenting device can be encoded directly in the visual output of the display screen and/or in audio output associated with the visual output, thus avoiding the need for additional communication channels to convey this information. Furthermore, a user can achieve a personalized and customized view of a display screen, where descriptive and other information can be displayed in the user's field of view according to user preferences without visually intruding on other users who are also viewing the display screen. In addition, features allow an augmenting device to detect a display screen in its field of view with reduced amounts of processing. A technical effect of displaying descriptive information and other information to a user as disclosed herein includes providing convenient and helpful information to a user that is directly conveyed by standard devices without the need for additional channels of communication, and which is discretely conveyed to the user of the augmenting device. Another technical effect is efficient processing of a field of view of an augmenting device to detect a display screen, thus reducing processing requirements of the augmenting device and allowing detection of the display screen to be more accurate and consistent.

Herein, the term "graphics" is used to refer to any type of visual information that can be displayed on a screen or field of view, such as in a field of view of an augmenting device. The graphics can be text, pictorial images, symbols, animations, or other visual information.

Figure 1:
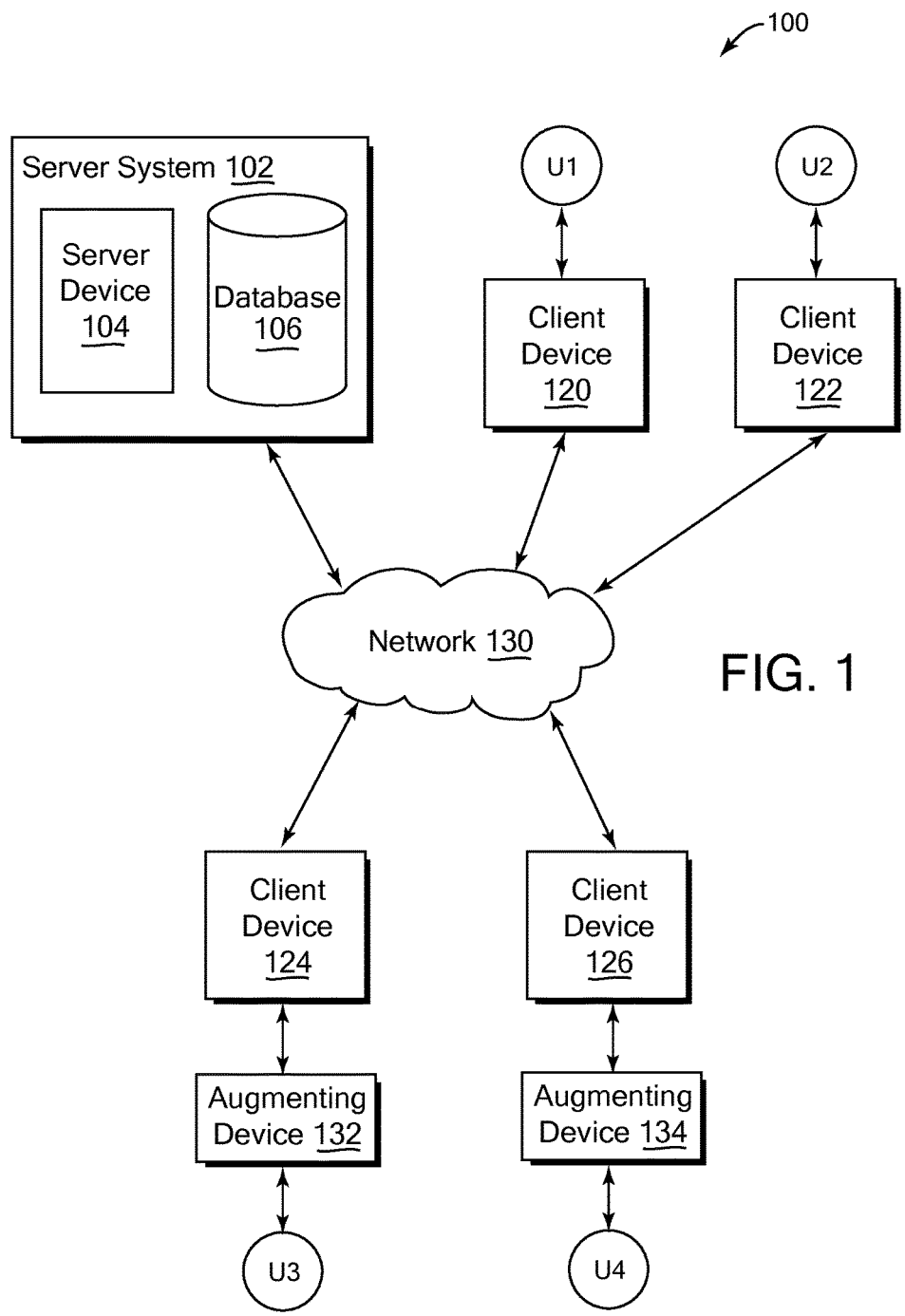
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wristwatch or other wearable electronic device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a service implemented on server system 102, where respective client devices 120, 122, 124, and 126 transmit communications and data to one or more server systems such as system 102, and the server system 102 provides appropriate data to the client devices such that each client device can receive content uploaded to the service via the server system 102. For example, the service can be a social network service, content sharing service, or other service allowing communication features. In some examples, the service can allow users to perform a variety of communications, form links and associations, upload, post and/or share content such as images, video streams, audio recordings, text, etc. For example, the service can allow a user to send messages to particular or multiple other users, form social links or groups in the form of associations to other users within the service or system, post or send content including text, images, video sequences, audio sequences or recordings, or other types of content for access by designated sets of users of the service, send multimedia information and other information to other users of the service, participate in live video chat or conferences, audio chat or conferences, and/or text chat or teleconferencing with other users of the service, etc.

A user interface can enable display of images, video, and other content as well as communications, privacy settings, preferences, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

The network environment 100 can also include one or more augmenting devices. In some cases, client devices such as client devices 120 and 122 can be augmenting devices or including similar functionality. In some implementations, an augmenting device can be another device at the client end in addition to the client device 120-126 and which, for example, can be in communication with a client device. In the example of FIG. 1, users U3 and U4 are using augmenting devices 132 and 134, respectively. In other implementations, all, fewer, or greater numbers of users can use these devices. Augmenting devices 132 and 134 can be any type of device (e.g., a device enabling "augmented reality") that is operative to display generated graphics overlaid or superimposed in a field of view of the augmenting device that displays or provides view of a scene of the physical world, e.g., a real-world scene. For example, in some implementations, the augmenting device can provide the real-world view directly through transparent or translucent material, such as the lenses or glass of glasses or goggles. In other implementations, the augmenting device can use a camera to capture the real-life scene and one or more display screens to display that scene, such as a camera, a cell phone, a tablet computer, a personal digital assistant, glasses or goggles having display screens, or other portable or wearable device.

In some implementations, the augmenting devices 132 and 134 can receive information associated with a display screen of the associated client devices 124 and 126 without the need for additional communication channels (besides a display screen and/or speakers), as described below. In some other implementations, the augmenting devices 132 and 134 can be in communication with the associated client device 124 and 126, respectively, via such communication channels as wireless RF or EM signals or wired connections. For example, in some implementations the augmenting devices 132 and 134 can receive information from the client device 124 and 126 that the client device received over the network 130. Similarly, the augmenting devices 134 and 126 can be operative to send information to the associated client device 124 and 126, such as commands, locations of the augmenting device, video or audio data, etc. The augmenting devices 132 and 134 can superimpose information and other graphics in the view of the augmenting devices, which in some implementations can relate to visual output displayed on a display screen of the client devices 124 and 126, as described below.

Figure 2:
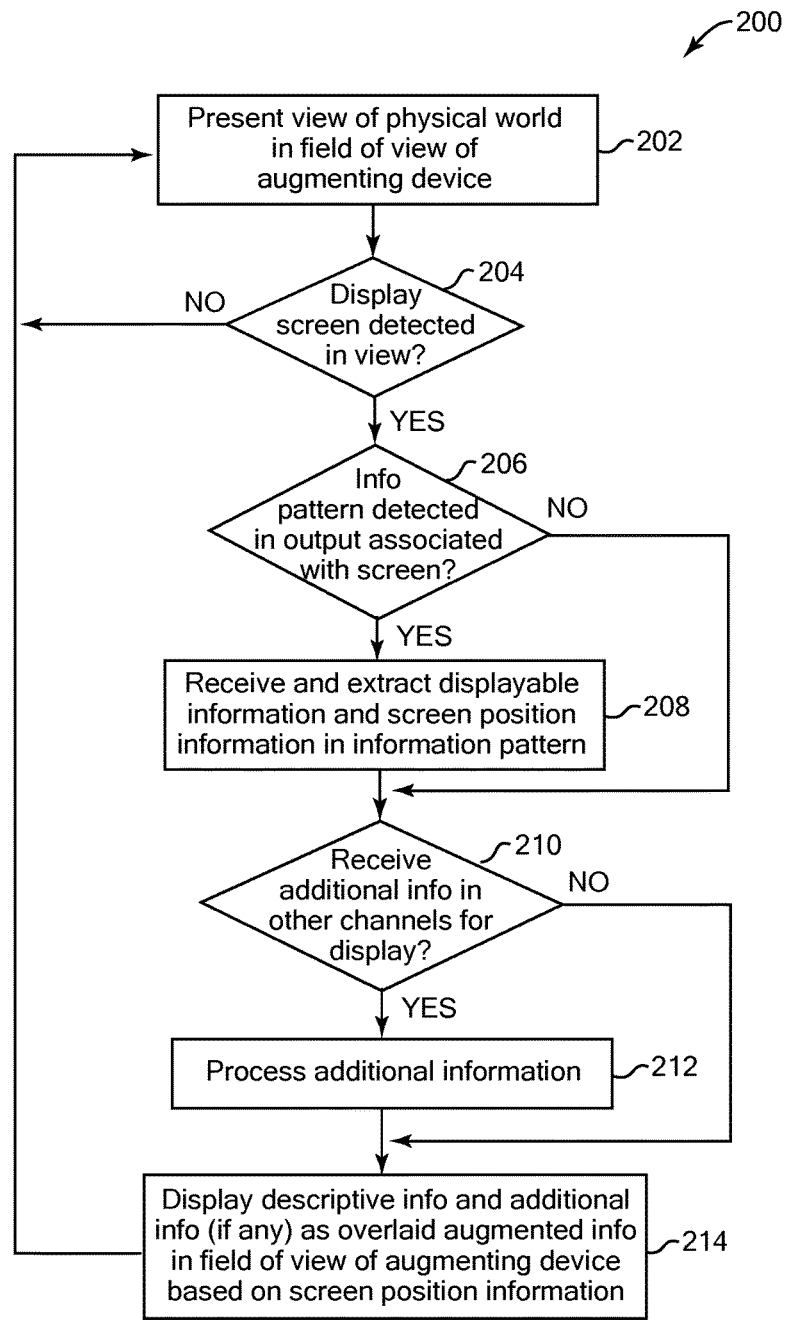
FIG. 2 is a flow diagram illustrating an example method for enabling augmented display of information by a device viewing a display screen, according to some implementations.

FIG. 2 is a flow diagram illustrating one example of a method 200 for enabling augmented display of information by a device viewing a display screen. In some implementations, method 200 can be implemented, for example, on system(s) such as an augmenting device, e.g., augmenting devices 132 and/or 134 as shown in FIG. 1. In other implementations, some or all of the method 200 can be implemented on other systems, such as an associated client device (e.g., client devices 124 and/or 126 of FIG. 1), on a server system 102 as shown in FIG. 1, and/or by a combination of augmenting device, client system, and/or server system. In some implementations, one or more augmenting devices, clients, and/or servers can perform different blocks or other portions of the method 200.

In described examples, the implementing system(s) include one or more processors or processing circuitry, and one or more storage devices such as memory, disk, or other storage. Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software. The method 200 can be performed as part of or component of an application running on a system, or as an application or software running in conjunction with other applications and operating system.

In some implementations, method 200 can be initiated based on user input. A user may, for example, have selected the initiation of the method 200 from an interface such as an application interface, web page, social networking interface, or other interface. In other implementations, the method 200 can be initiated automatically by a system. For example, the method 200 (or portions thereof) can be performed whenever a display screen comes into the field of view of an augmenting device or in the view of a camera or other image-capturing device. Or, the method can be performed based on one or more particular events or conditions such as a particular display screen coming into view (e.g., the screen marked with or displaying a visual identifier recognizable by the viewing device, or the screen's system providing a signal identifier such as radio or infrared signals). Or the method can be performed if the augmenting device (or other device performing method 200) receives a particular command visually, via electromagnetic signal, via sound, via haptic signal, etc. In some implementations, such conditions can be specified by a user in custom preferences of the user having control over the viewing device. In one non-limiting example, method 200 (or parts thereof) can be performed on a client device that has captured one or more images. In addition or alternatively, the client device can send images to a server over a network, and the server can process the images using all or part of method 200.

In block 202, the method presents a view of the physical world (e.g., surrounding physical environment) to a user in a field of view of an augmenting device. In some implementations, the augmenting device provides a field of view that is a direct view of a scene of the physical world, e.g., a "see-through" field of view. For example, an augmenting device can provide a transparent or partially transparent material in the field of view, such as a glass or plastic, that when placed in front of the user's eye(s), allows the user to view the surrounding physical environment through the field of view. The augmenting device is also able to display generated graphics on the see-through material which the user can see. In some examples, such an augmenting device can be eyewear (glasses, goggles, etc.) or similar article which is worn on the user's head and positions a field of view in front of one or both of the user's eyes. Some implementations can provide a see-through field of view and can also capture images (e.g. frames) of that field of view over time with a camera that is part of or connected to the augmenting device. For example, such images of the field of view can be examined by the method 200 to detect markers, patterns and/or objects, as described below. In some implementation, the next frame (image) in a sequence of frames of a video stream can be captured in block 202.

In other implementations, the augmenting device can provide a field of view that is displayed on a display screen, where the screen displays a view of the physical world. For example, one or more cameras of the augmenting device (or camera(s) of another device connected to the system performing block 202) can capture one or more images depicting the physical world, and provide those images to the system to be displayed on one or more display screens of the augmenting device (or displayed on a screen of a connected other device) viewed by the user. Each image can be a digital image composed of multiple pixels, for example, and can be stored on one or more storage devices of or connected to the augmenting device. For example, the captured images can be frames in a video stream. In some examples, a cell phone or other portable device can include a camera on one side of the device which captures images of the physical world, and those images are displayed on a display screen located on the other side of the device, which is viewed by the user. Similarly, a tablet computer, PDA, laptop computer, or other portable device can include a camera and display screen used in this way. In some implementations, glasses or goggles worn by the user can include display screens positioned in front of the user's eyes to display images captured by one or more cameras. Alternatively or additionally, a desktop or server computer connected to a camera and display screen can be used as the augmenting device to similarly provide a field of view that can be augmented with displayed graphical images.

In block 204, the method checks whether a physical display screen has been detected in the field of view of the augmenting device. For example, the method can examine the field of view of the augmenting device and check whether a display screen, or a portion of a display screen, is presently located in that field of view. For example, the method can examine one or more of the latest frame(s) of a video stream depicting the field of view as captured by a camera of the augmenting device. For wearable or movable augmenting devices, a display screen can enter the field of view when the user moves the augmenting device so that the field of view of the device are oriented to a physical scene including the physical display screen.

The display screen can be controlled by a different system, such as a desktop computer, server, portable device, or other device. In various implementations, the display screen displays visual output that can be a still image or a stream of video frames. In some example implementations, depictions of one or more objects can be displayed on the display screen by the system controlling the display screen. The objects can be any type of objects, such as persons, animals, objects, settings, landscapes, or other objects. Some examples of detecting a display screen in block 204 are described below with respect to FIG. 3. If no display screen is detected in the field of view, the method returns to block 202. If a display screen is detected, the method continues to block 206.

In block 206, the method checks whether one or more information patterns are detected in output associated with the detected display screen. In some implementations, the output is the visual output of the display screen, and the method checks for a visual information pattern in that visual output. For example, the augmenting device can examine one or more images capturing its field of view (e.g., captured with a camera) to look for one or more information patterns within the extents or borders of the visual output of the detected display screen. The visual information pattern can be any type of visual encoded information which can be retrieved visually by examining the visual output of the display screen. In some examples, the information pattern can be a standard type of pattern such as a QR Code® or other two-dimensional code, a bar code, or pattern provided in some other two-tone (e.g., black and white) encoding standard. In other examples, the information pattern can include multiple colors to encode the information, and/or can be a custom or specialized pattern. The information pattern can be contained in a single particular area of the display screen, or can be split into multiple parts. For example, in some implementations, portions of the information pattern can be displayed in different areas or regions of the display screen in locations for which the method knows to look. The detected different portions can then be combined to obtain the full information pattern. In some implementations, the information pattern can be displayed in non-visible light (e.g., infrared, etc.) if the display screen is capable of emitting such light, where a specialized camera on the augmenting device can capture the non-visible light to find and decode the information pattern.

In some implementations, the method can check whether one or more audio information patterns are detected in audio output associated with the detected display screen. For example, the audio output can be associated with concurrent visual output of the display screen. In various examples, the audio output can be output from one or more speakers connected to a system providing the visual output of the screen. For example, the audio output can be voices of people displayed in the visual output and/or can be ambient sound, sound effects, music, or other audio associated with the visual output of the display screen. The audio information pattern can be any type of pattern provided via various sound frequencies which can encode information, such as particular sequences of sounds, sounds in a predetermined code, etc. In some implementations, the audio information pattern can be provided and detected at frequencies that are not heard by humans, or at frequencies unintrusive to humans, e.g., detected by using one or more microphones of the augmenting device sensitive to such frequencies. In some implementations, both visual and audio information patterns can be detected, each providing different displayable information. Some implementations can ignore a received and detected audio information pattern if a display screen has not been detected in the field of view, and some implementations can increase processing power devoted to detecting a display screen once the audio information pattern is received.

If the method has not detected any information patterns, then the method continues to block 210, described below. If one or more information patterns have been detected, the method continues to block 208 in which the method receives the information pattern(s) (visually and/or aurally) and extracts displayable information and screen position information (e.g., metadata) in the information pattern. For example, the method can decode the information using standard decoding techniques for standard types of information patterns, or using custom decoding techniques for custom types of information patterns.

The displayable information can include any type of information, such as text, pictorial graphics, symbols, animations, and/or any types. In some cases, the displayable information can include descriptive information which describes one or more objects (and/or the characteristics of the one or more objects) displayed on the display screen. For example, if one or more objects such as persons are displayed on the display screen, the descriptive information can include one or more discrete "descriptors" such as a name, title(s) (e.g., job title, organization title, etc.), occupation, various types of real and virtual addresses, current geographic location, preferences, or other descriptors associated with and describing one or more of those persons. In one non-limiting example as described below with reference to FIG. 5, the display screen can be displaying a scene of one or more persons who are communicating with the user of the augmenting device in a video conference, and the descriptive information can include the descriptors of name and job title of each person appearing on the display screen in the video conference. If one or more displayed objects include one or more articles, animals, objects in a landscape scene, and/or other objects, the descriptive information can include descriptors such as a descriptive noun, brand, place of origin, price, list of ingredients, serial number, or other information associated with or describing characteristics of the objects.

The displayable information in the information pattern can also include "unassociated displayable information," which is displayable information that is not associated or related to any objects displayed on the display screen. For example, the displayable information can be a listing, diagram, or other form of information referring to a variety of subjects that are not associated with displayed objects. Some examples of information include upcoming events or meetings, times, calendars, schedules, alarms or notifications, advertisements, news, maps, etc.

The information pattern also includes screen position information. This is information that indicates one or more screen positions in the visual output of the physical display screen that is displaying the information pattern. For example, the screen position information can include one or more sets of x-y screen coordinates that each indicate a two dimensional location on the display screen with reference to a coordinate system imposed on the display screen. The screen coordinates can be referenced to an origin selected at any location on the display screen, such as the lower left corner of the screen, upper left corner, etc. In some implementations, the screen coordinates can be referenced only within the image of the physical display screen provided in the field of view, and do not extend outside the borders of that display screen image. In other implementations, the referenced positions can extend outside the borders of the physical display screen (yet still be located in the same plane as the screen), where such positions are able to be viewed in the field of view of the augmenting device. Other types of coordinates or positions can be provided in other implementations.

The screen position information references positions within the plane of the display screen, which may not directly translate to the same positions in the field of view of the augmenting device. For example, if the display screen is a rectangular display screen currently viewed directly perpendicular to the plane of the physical display screen in the field of view of the augmenting device, then the sides of the display screen image seen in the field of view are parallel (or approximately parallel) to the sides of the field of view (if the field of view is rectangular). If the augmenting device is viewing the display screen at a non-perpendicular angle to the plane of the display screen, then the sides of the display screen are angled with respect to the sides of the field of view. In various implementations, the screen positions can be converted to the orientation seen in the field of view, or can be converted to a different orientation, such as the plane of the field of view of the augmenting device.

The screen position information is associated with displayable information decoded from the information pattern. For example, screen position information can indicate a position in the visual output of the display screen to display a particular portion of the displayable information accompanying that screen position information. In some implementations, the screen position information does not indicate the actual position at which to display the associated displayable information, but indicates a position that is referenced by the method in order to determine the actual position at which to display the associated displayable information. For example, the screen position can indicate a particular position and the method knows that the associated displayable information should be displayed at a particular distance and direction from the given position. The distance and direction can be predetermined, or can be determined by the method dynamically based on one or more predetermined conditions, such as the location or movement of objects in visual output of the display screen, the location or motion of the user using the augmenting device with respect to the display screen, other states of the visual output and/or augmenting device, etc.

The displayable information can be descriptive information associated with one or more objects displayed on the display screen as described above, and the screen position can also be related to those associated object(s). In some examples, the screen position information can indicate the screen position of those associated objects as a reference that guides the method in the display of the associated displayable information in the field of view. Or, the screen position information can indicate a screen position of a predetermined part of the associated objects (e.g., a head of a person). Or, the descriptive information can indicate a position that is a predetermined distance and/or direction from the associated object(s), such as a particular distance above a person's head, which can be used by the method as a direct position at which to display the associated descriptive information.

In some implementations, the descriptive information can include one or more descriptors, e.g., a set or group of descriptors associated with a particular object displayed on a display screen. The screen position information can describe one or more screen positions for that set of descriptors. For example, in some implementations, the screen position information can include a screen position for each descriptor in the descriptive information. In other implementations, the screen position information can include a screen position for a set of descriptors associated with a particular object displayed on the screen. In another example, each set of descriptors can be associated with a different object depicted on the physical display screen, and the screen position information can include one or more positions on the display screen, each position being associated with a different set of descriptors.

In a non-limiting example, extracted descriptive information can include a set of descriptors including name and job title for each person displayed on the screen in a video conference. In some implementations, the screen position information can provide a screen position for the entire associated set of name and title descriptors. In other implementations, the screen position information can provide the screen position for each of the descriptors in the set, such as a screen position for the name and a screen position for the title.

In some implementations, unassociated displayable information from the information pattern is not associated with any objects displayed on the screen, but is associated with screen position information from the information pattern. For example, such unassociated displayable information may be desired to be displayed at a particular position in the field of view of the augmenting device, and this position can be indicated directly or indirectly with the screen position information. In one example, the displayable information can include a schedule of events in a video conference being displayed on the display screen, such as descriptions and intended timings of the events (some or all of which can be displayed in the field of view as described below). In another example, the unassociated displayable information can include descriptions of future events or appointments, descriptive information for persons or other objects currently located off the screen (and related in some way to the visual output on the display screen), images, videos, animations, etc.

In block 210, the method optionally checks whether additional information in other communication channels has been received by the augmenting device related to the display in the field of view. For example, in some implementations, the augmenting device may include a wireless transceiver operative to receive wireless signals including such additional information. Some implementations can use an augmenting device that is connected to other systems by wires that can receive information from those other systems. In some implementations, the augmenting device can retrieve and examine stored data such as calendar or booking information which indicates the identities or other descriptive information for objects located in a known location that is displayed on the display screen. In some implementations, the augmenting device can examine an image of the field of view to check for recognizable objects displayed on the display screen to supplement the information received in the information pattern. For example, facial recognition techniques for persons, or other object recognition techniques for other objects, can be used to determine an identity of each object, where the augmenting device has access to a database of facial features faces and other features that are compared to the objects in the image, as well as the associated identity information for recognized objects. In some implementations, the augmenting device can include one or more microphones or other sound sensors which can be used to detect recognizable sounds, such as voices, output in conjunction with the visual output on the display screen, allowing the augmenting device to compare received sounds to reference sounds stored in a database and link the sounds to an identity or other descriptive information. Additional unassociated information which is not associated with any objects displayed on the display screen can also be received using any of these communication channels and techniques.

If the method has received additional information in block 210, then in block 212 the method processes that additional information as described above. After block 212, or if no additional information was received in block 210, the method continues to block 214, in which the method displays (or causes the display) of the displayable information (and additional information, if received) as augmented information overlaid or superimposed in the field of view of the augmenting device. For example, the augmented information is provided as generated graphics overlaid in the field of view of the augmenting device, e.g., such as "augmented reality" images.

The method displays the displayable information in the field of view based on the position of the display screen in the field of view, and based on the screen position information received in the information pattern. The display is based on the position of the display screen since the screen position information references that display screen. The particular position in the field of view at which the method displays the displayable information can vary in different implementations.

For example, in some implementations, the received screen position information can indicate a screen position of a predetermined portion of each associated object displayed on the screen. In one non-limiting example, the screen position information indicates the screen position of the head of each person for whom descriptive information was transmitted in the information pattern, and the method knows to display the associated descriptive information (such as name, title, etc.) at a predetermined distance and direction with reference to the associated screen position, and display multiple associated descriptors in a predetermined configuration with respect to each other. For example, the method can display the title at a predetermined distance directly above the associated screen position, which would be directly above the associated person's head, and can arrange the descriptors to display the name above the title. Some implementations can provide a screen position that is the approximate furthest point of an associated object in a particular direction, so that the method knows where to display the associated descriptive information in the same direction past the furthest point of the object.

In some implementations, the screen position information for an associated object can be multiple screen positions that describe the associated object in greater detail, such as the furthest points of the object in predetermined directions (e.g., positions at the perimeter of the object), the centre of the object, etc. For example, the screen positions can indicate extents or borders over which the displayable information should not extend or overlap. Some implementations can provide multiple screen positions associated with a set of multiple descriptors, where the positions can indicate where to display each of the multiple descriptors.

The displayable information can be displayed so as to appear to the user of the augmenting device that it is displayed on the display screen, e.g., with any objects associated with that displayable information. For example, the names and titles of displayed persons can be displayed within the same plane of the display screen, and within the borders of the display screen, where, for example, if the descriptive information does not fit within the borders of the display screen, the descriptive information can be reduced in size by the method until it fits. In other implementations, the display of the descriptive information need not be constrained by the orientation and/or size of the display screen in the field of view. For example, the name and title of an associated person can be displayed above that person and overlapping and extending out of the borders of the display screen but still in the field of view of the augmenting device.

In some implementations, the method can determine where the descriptive information would best be displayed based on the current screen positions of the objects on the screen and/or based on the current position of the display screen in the field of view. For example, if displaying the displayable information above an object would obscure other objects or other displayable information, then the method can display the displayable information on a different side of the object where a minimal amount of such obscurations would occur. In another example, if the display screen is currently near top of the field of view, the method can display displayable information under depicted objects where there is more space in the field of view.

Displayable information can be displayed in the field of view as if it is located within the same plane as the display screen. For example, the screen coordinates for the displayable information can be converted to the plane of the display screen at its current orientation in the field of view. In other implementations, the information can be displayed independently of the orientation of the physical display screen in the field of view, e.g., displayed within or parallel to a plane of the field of view.

The display of the displayable information can also be based on preferences of the user using the augmenting device. For example, the user may have set preferences previous to the performance of block 214 to display descriptive information above associated objects on a viewed display screen at a certain distance with respect to associated objects, and/or in a certain size, color, font, style, transparency (e.g., amount that the original display screen output can be seen through the displayed descriptive information), etc. The user may also be able to set preferences as to particular events or conditions which cause the displayable information to be displayed. For example, the user may be able to set the amount of time which the field of view should remain approximately steady to allow the displayable information to be displayed, as described below with reference to FIG. 3. In some implementations, the user can identify which objects (e.g., identities or types of objects) are to trigger the display of associated descriptive information and whether descriptive information is to be displayed only for the identified objects or for all displayed objects. The user also can identify which objects are to be without the display of the associated descriptive information. For example, in some implementations, once the identities of persons are known via the descriptive information, the method can check a database (such as social networking service or other service) to determine whether each identified person has provided permission to display descriptive information associated with that person. Some implementations can check permissions of a person before descriptive information about that person can be displayed, such that the information is not displayed unless permission has been granted.

The display and descriptive information in block 214 is associated with the current state of the field of view of the augmenting device as determined in the previous steps. To continue displaying the descriptive information at the correct screen positions with respect to the displayed objects, the method may have to re-read an updated new information pattern displayed on the display screen to obtain the updated positions of the displayed objects. Therefore, after block 214, the method can return to block 204 and check whether the display screen is still detected in the field of view.

Figure 3:
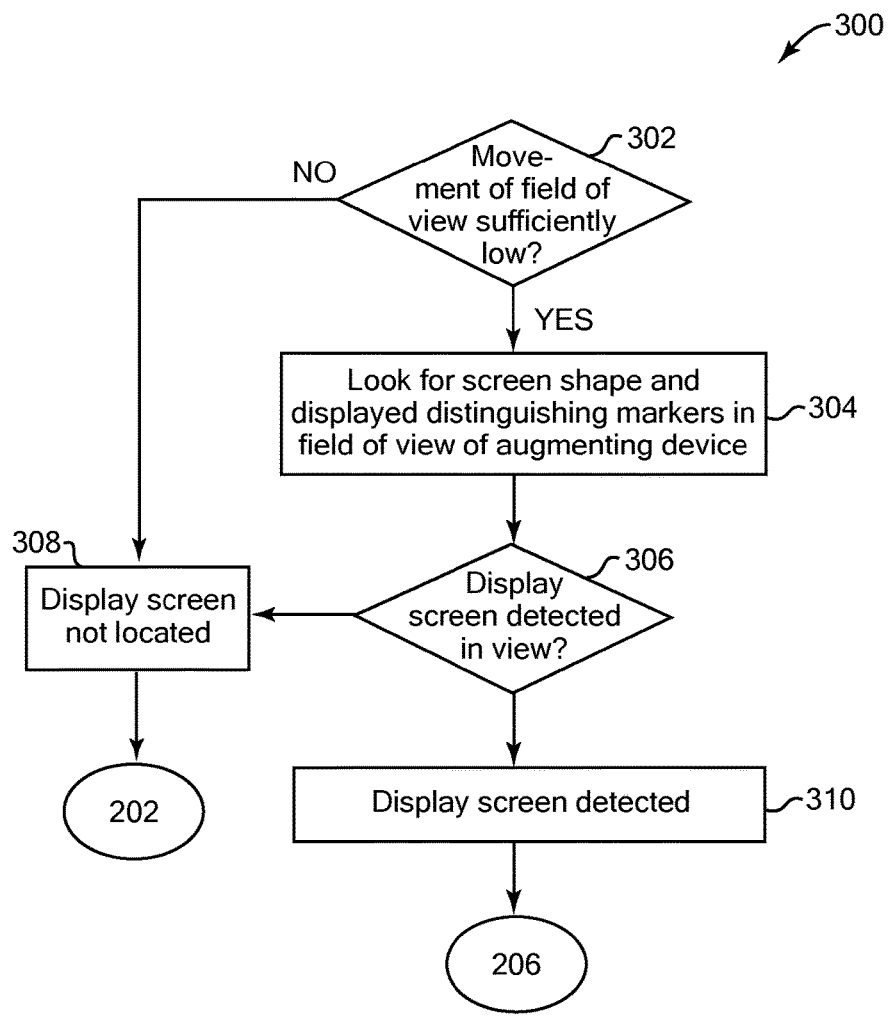
FIG. 3 is a flow diagram illustrating an example method for implementing a block of FIG. 2 in which the method checks whether a display screen is detected in the field of view of the augmenting device.

FIG. 3 is a flow diagram illustrating an example method 300 implementing block 204 of FIG. 2, in which the method checks whether a display screen is detected in the field of view of the augmenting device.

In block 302, the method checks whether movement of the field of view is sufficiently low to proceed to screen detection. For example, for wearable or portable augmenting devices, the field of view may be in motion whenever the user moves the augmenting device, e.g., whenever the user moves his or her head when using goggles or glasses devices, or moves another part of the body holding or wearing the device. In some implementations, the method can check a sequence of frames (or other images) captured by a camera of the augmenting device to determine the rate of motion of the field of view.

In this example implementation, the method tries to detect a display screen in the field of view in response to the field of view having motion under a predetermined threshold. This indicates that the augmenting device has become approximately stable and non-moving. In some implementations, the block 302 can also require that the field of view motion remains under the threshold for a predetermined amount of time before deciding on an affirmative result. In addition, the method can check the motion of the field of view periodically after the motion is below the threshold, to determine if increased motion over the threshold has resumed such that processing for detection of the video screen (described below) should be halted. Such features cause display screen detection to be less computationally intensive for the method since the field of view is analyzed for display screen detection only during certain time periods when the motion is sufficiently low.

If the motion of the field of view is not sufficiently low as checked in block 302, then the method returns to block 202 of FIG. 2 to capture the next frame(s) and present the field of view, and then returns to monitor the motion of the field of view at block 302. Thus, the method waits for the motion to settles down to an amount below the predetermined threshold. If the motion of the field of view the detected to be sufficiently low in block 302, then in block 304 the method looks for a display screen in the field of view. For example, if the augmenting device captures images over time that provide the field of view, the method can examine the latest captured image or latest multiple captured images.

In this example, the method looks for a display screen shape and/or looks for one or more highlight markers in the field of view. To look for a display screen shape, the method can look for a rectangle shape or other known shape of display screens, and can also look for a particular higher brightness of the rectangle shape than in surrounding or background pixels, indicating the visual output of an active display screen.

The method can alternately or additionally look for one or more highlight markers that the method knows are displayed by a display screen when using features described herein. In one example, the highlight markers can be included in the visual output of the display screen by the system controlling the display screen. Any of a variety of types of highlight markers can be used, which should be designed to be easily recognized when examining one or more images of the field of view. In some examples, the highlight markers can include highlighting of one or more pixels in one or more particular areas of the display screen output. For example, one or more corners of the display screen can include a highly visible marker such as red pixels or pixels of another noticeable color. Other areas at or near the borders of the display screen can alternatively be marked with the highlight markers, such as the borders (or portions of the borders) of the display screen, thus indicating the extents of the screen to the augmenting device. In some implementations, the highlight marker(s) can be made to blink at a particular rate that is looked for by the method, e.g., over multiple captured frames of the field of view. For example, the blinking can be made subtle to viewing persons but easily recognized by the method by examining multiple images captured in sequence.

Checking for motion in the field of view (as in block 302) allows the augmenting device to reduce the times when it checks for a display screen. Checking for displayed highlight markers (as in block 306) reduces the processing of images required to determine whether a display screen is detected in its field of view, since the highlight markers are easier to detect. Thus, features such as these can reduce the processing needed by the augmenting device to detect a particular object such as a display screen in its field of view.

In block 306, the method checks whether the display screen detected. If not, the method determines that no screen is detected in block 308 and returns to block 202 of method 200 so that one or more images of the field of view can again be captured and checked. If a display screen has been detected, then in block 310 the method indicates that a display screen has been detected, and the method ends and returns to block 206 of method 200 of FIG. 2.

Figure 4:
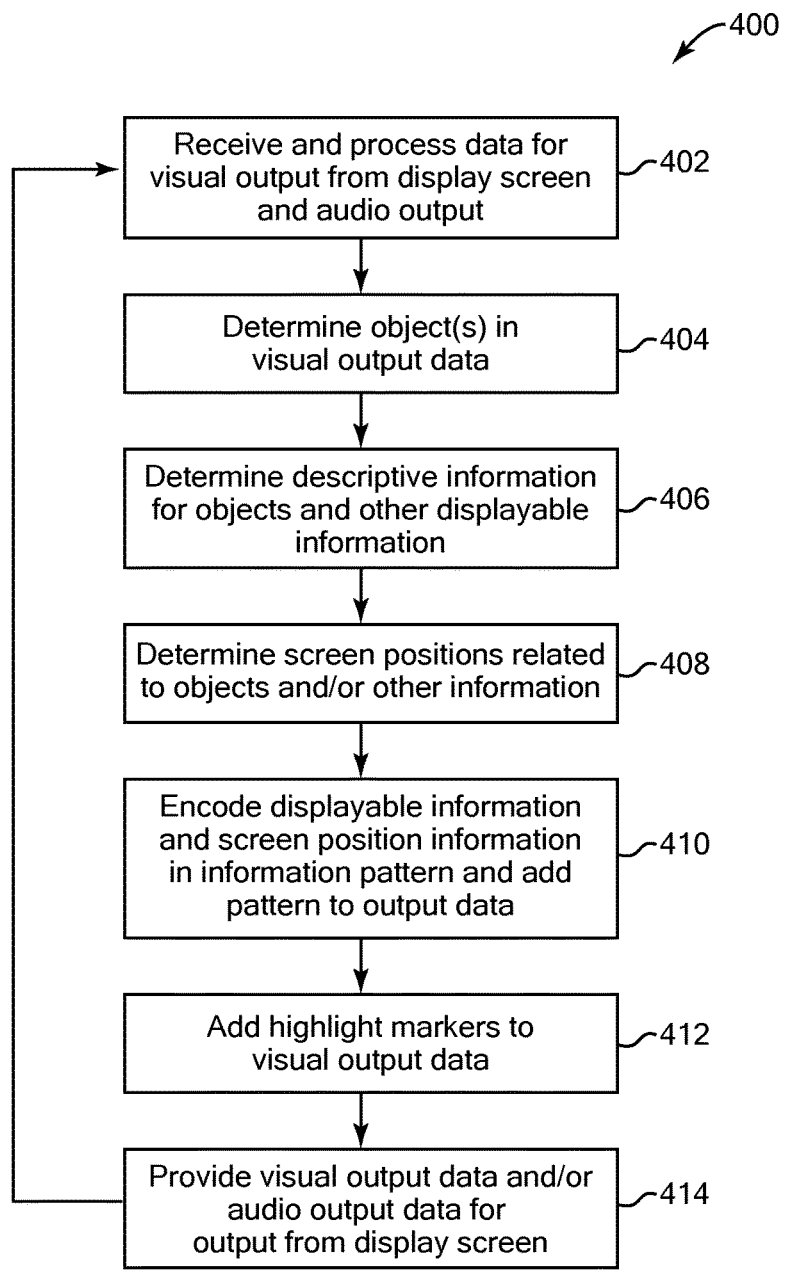
FIG. 4 is a flow diagram illustrating an example method for providing output associated with a display screen that can be detected by an augmenting device as described in FIGS. 2 and 3.

FIG. 4 is a flow diagram illustrating an example method 400 for providing output associated with a display screen that can be detected by an augmenting device as described in FIGS. 2 and 3. Any suitable system can implement method 400, such as a desktop computer, laptop computer, portable device, wearable device, server, or other system. In some examples, one or more systems implement method 400 independently of an augmenting device performing methods 200 and 300. For example, a system performing method 400 can be providing visual output to a display screen while implementing a video conference with one or more other connected systems. In some cases the system does not know if an augmenting device is receiving the output associated with the display screen. In other cases, the augmenting device is connected with and can exchange information with the system performing method 400.

In block 402, the method receives and processes data for visual output from a display screen and/or for audio output from an audio output device (e.g., speakers). For example, the data can include visual output data received for causing a display of suitable visual output by the system, such as data providing a displayed application interface, video, image, and/or other visual output. In an example of a video conference, this data can include one or more video streams, each depicting a physical location at which one or more participants of the conference are visible. For example, the visual output data can include data representing a single frame in a video stream which is to be output on the display screen. The data can also include audio output data received for causing output of audio by the system, such as audio synchronized or correlated with the visual output. The audio output data can provide voices in a video conference, ambient sounds, sound effects, music, etc.

In block 404, the method can determine one or more objects depicted in the visual output data. The method can use any of a variety of techniques to detect and/or otherwise determine the objects. For example, the method can detect and recognize one or more objects using techniques such as facial or other object recognition, body or skeletal classifiers used over multiple frames of a video stream, visual markers worn by objects in the video stream, sensors provided at a physical location to detect objects in the scene, voice recognition of sensed sound, active devices worn by objects and providing external radio, infrared, or other electromagnetic signals, triangulation of device signals worn by the objects, and/or other techniques. In some implementations or cases, the method receives data from a different source, where the data locates one or more depicted objects in the visual output data.

In block 406, the method determines descriptive information for the objects found in the visual output data, and determines other displayable information intended for inclusion in the information pattern. For descriptive information such as names, titles, or other identifying information, the method can identify persons in the visual output data. For example, the method can identify detected persons using additional information such as calendar information indicating persons located at the site captured in the video stream, database information for comparing facial characteristics in facial recognition techniques, voice characteristics for voice recognition techniques, device signals, or other identifying characteristics of persons depicted in the visual output data. Some descriptive information can be determined by comparing the depicted objects in the visual output data to database information identifying the type of object or other characteristics. In some implementations, the types and amount of descriptive information determined can be based on any of several factors, such as the type of application for which the visual output data is being used (e.g., video conferencing at a work setting, informal video chat, educational documentary or presentation, commercial, etc.). Descriptive information can also include other information not identifying the associated objects, such as descriptions of object characteristics (e.g., visual characteristics such as clothes, etc.). Other displayable information not associated with depicted objects can be determined in block 406, such as event or schedule data, which can be received by the system implementing method 400 and/or can be determined by the method from other data sources. In some implementations, the method can check permissions of a person before descriptive information about that person is utilized or encoded in an information pattern, where the information is not used or encoded unless permission has been granted.

In block 408, the method determines the screen positions related to identified objects in the visual output data, and/or determines the screen positions for other displayable information not associated with objects. In various implementations, the method can determine the screen position of a particular portion of an object (e.g., the heads of depicted persons), the screen positions of borders of the object, and/or screen positions of locations having a predetermined distance and direction from the associated objects, those locations having been predetermined to be suitable as locations for displaying the descriptive information by the augmenting device. Multiple screen positions can be determined for each identified object, in some implementations, as described above. The method can also determine screen positions for other displayable information that is not associated with any depicted objects in the visual output data. For example, the method can determine a type or amount of displayable information (e.g., calendar or meeting data, schedules, etc.) and can determine the screen positions for that information based on its type and/or amount. Screen positions can be based on user preferences and/or on the positions and/or types of objects displayed in the visual output data. For example, calendar information can be designated to be displayed in a lower left corner of the screen, or can be displayed in a screen position set by user, system preferences, or other dynamic conditions or events.

In block 410, the method encodes the displayable information and screen position information into an information pattern and adds the information pattern to output data. For example, the information pattern can be a visual information pattern that is added to visual output data. In some implementations, the method can place or insert the information pattern in the visual output data so that the information pattern is displayed in a known predetermined location of the display screen which the augmenting device can look for when receiving the visual output data. For example, in some implementations, an information pattern such as a bar code or QR code can be placed in a side or corner of the display screen that is away from any main content that is the focus of the visual output data. The information pattern can be made of a large enough size for the augmenting device to detect it in the visual output, and small enough as to be not distracting to viewers viewing the visual output on the display screen. Information patterns can be located at other screen positions in other implementations, such as two patterns positioned on opposite sides of the screen, etc. In some implementations, the information pattern can be an audio information pattern that is added to audio output data. For example, an audio pattern can be inserted between other sounds (voices, ambient sound, sound effects, etc.), can be inserted into the audio output data so that such patterns are periodically output according to a predetermined schedule or time interval, and/or can be output alongside the audio output, e.g., at a high or low enough sound frequency to be indistinguishable to listeners.

In block 412, the method adds one or more highlight markers to the visual output data. As described above with reference to block 304 of method 300, such highlight markers can be displayed in predetermined locations which can help the augmenting device locate the display screen in its field of view. For example, markers of a specific color and size can be added to the corners, borders, and/or other locations on screen which can help indicate the extents of the display screen. If blinking markers are used, then the highlight markers can be added in some (e.g., periodic) frames of the visual output data and not added (or altered) in other frames between those frames to provide a blinking or flashing effect.

In block 414, the method provides the visual output data for visual output on a display screen and provides the audio output data for output by audio devices. In some implementations, the method 400 can be implemented by a system at the same physical location as the user and augmenting device, and the method can directly provide the visual output data to a display device having the display screen and/or the audio output to speakers at the physical location. In other implementations, the method 400 can be implemented by system at a remote location to the display screen and/or speakers, which provides the visual and/or audio output data to another system at the physical location of the user and/or to a display device and/or speakers at the physical location of the augmenting device. Some implementations can use multiple systems in different locations performing different parts of the method 400.

After block 414, the method can return to block 402 to continue to receive and process output data. For example, the method may receive and/or process the next sequential frame in a video stream, which is again analyzed to detect objects, and to determine displayable information and screen position information as described above. In some implementations, objects that were previously identified in the visual output data can be tracked over multiple succeeding frames so that such objects need not be detected and identified again. For example, the descriptive information of these objects need not be determined again, but the screen position of the objects can be periodically updated to track any objects moving with respect to their positions in the most recent previous frames. In another example, the method may receive and/or process the next portion of audio data for output.

Various blocks and operations of methods 200-400 can be performed in a different order than shown and/or at least partially simultaneously, where appropriate. For example, blocks 206 and 210 (and their following blocks) can be performed simultaneously. In some implementations, blocks or operations of methods 200-400 can occur multiple times, in a different order, and/or at different times in the methods. In some implementations, the methods 200, 300, and/or 400 can be implemented, for example, on one or more client devices which can perform one or more blocks instead of or in addition to server system(s) performing those blocks. For example, a client device (such as an augmenting device) can perform most blocks and can request more complex or intensive processing to be performed by a server or other client device in communication with the client device.

Figure 5:
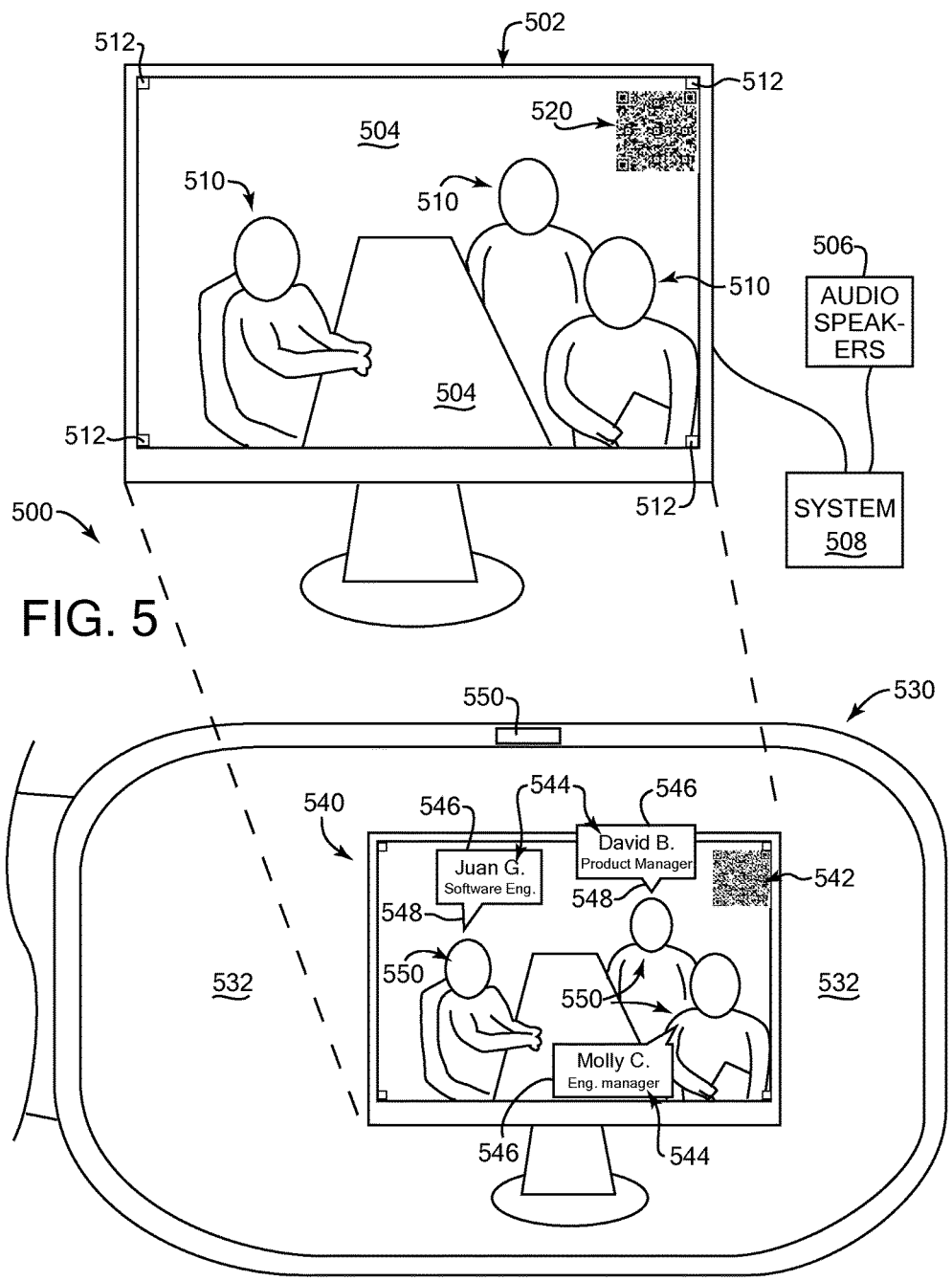
FIG. 5 is a diagrammatic illustration of an example implementation of an augmented display of information by a device viewing a display screen.

FIG. 5 is a diagrammatic illustration of an example implementation 500 of an augmented display of information by a device viewing a display screen. A physical display screen 502 displays visual output 504, audio speakers at the same present location as the screen 502 outputs audio, and a system 508 controls the visual output displayed on the screen 502 and the audio output from speakers 506. In this example, the visual output displays a scene in a video conference, where persons 510 are depicted in a live video stream that captures images and sound at a remote physical location at the other end of the conference, and the persons 510 can similarly view images from a physical location at which the display screen 502 is situated. For example, the video conference scene can be displayed by a video conference application or similar program run by system 508. In other implementations, the visual output 504 can be provided in other applications, such as media viewing, display by an application program, etc. In various cases, the visual output can be in the form of interactive graphical display, sequential video, one or more still images, etc.

The visual output of display screen 502 includes highlight markers 512. In this example, the markers 512 include one marker displayed in each corner of the display screen's output. Highlight markers 512 can be displayed in a distinctive color to allow an augmenting device to detect the visual output 504 in its field of view more easily. In other implementations, the markers 512 can be made to blink or flash, move in prescribed directions, or perform some other distinctive action for which an augmenting device can check in its field of view.

The visual output of the display screen 502 includes an information pattern, which in this implementation is a code 520, such as a QR Code®. Code 520 is displayed in a corner of the visual output of the display screen so as to not impinge on the central focus of the visual output, which is the depicted persons 510 participating in the video conference, but can alternatively be displayed at any screen location. In this example, code 520 encodes displayable information including descriptive information associated with the persons 510. For example, the descriptive information can include the name and job title of each person 510 depicted in the visual output. In addition, code 510 includes screen position information related to the persons 510. In one example, the system 508 can determine the current screen positions of locations above the persons' heads where the descriptive information should be displayed. In other implementations, the system 508 can encode the screen positions of, for example, the tops of the heads of the persons 510 and encode those screen positions in the code 520. In some implementations, the system 508 can check the space around each object which associated with descriptive information to determine if sufficient space is available. The screen positions encoded in the code 520 can then be positions that the system 508 has determined are suitable for information display, e.g., not blocking other objects of interest such as other persons 510.

One example of information encoded in the code 520 is shown below.
size: 1280×1024
who: [{"Juan G.","Software Eng.",(420,200)},
{"Molly C.","Eng. Manager",(810,916)},
{"David B.","Product Manager",(841,52)}]
In this example, the size of the visual output of the display screen is given as the "size", e.g., in number of pixels. Then after the "who" designation the information lists three sets of descriptors, which in this example each include the name and then job title for that name. A screen position is listed after the job title in each set, and is associated with that name and title. In this example, the screen position is a set of x-y coordinates within the area having the listed size and referenced to a known origin, such as the upper left corner. For example, this can be the screen position at which the associated name and title should be displayed, with the title under the name. The displayed code 520 can be updated continuously and in real time by the system 508 to reflect new or different screen positions for the displayable information. For example, if a person 510 moves within the scene, the screen coordinates for that person's name and title can be updated such that the screen position is always located a particular distance above the person's head.

In some implementations, the system 508 can also output an audio information pattern in audio output from speakers 506. Standard audio output is provided during the video conference to communicate the speech of any of the persons 510 at the remote location, and any other sounds, to the present location. In some examples, an audio information pattern can be output simultaneously to the standard audio output, e.g., at a high or low enough frequency so as not to be heard by anyone at the present location of the display screen 502 and speakers 506. The audio information pattern can encode some or all of the displayable information described above in the visual information pattern, e.g., as a backup method of transmission that is useful if the code 520 is not reliably seen or decoded by the augmenting device. The audio pattern can also encode supplemental displayable information associated with the depicted persons 510 or other objects, or unassociated with any on-screen objects. In one example, a visual information pattern can encode descriptive information associated with depicted objects 510, and an audio information pattern can encode unassociated displayable information that is not associated with displayed objects as described above. The system 508 can periodically output and/or update the audio information pattern over time. In some cases, the updated audio pattern can update screen position information related to displayed objects on the screen.

FIG. 5 also shows a portion of an example augmenting device 530 that is located at the present physical location of the display screen 502 and the speakers 506. In this example, augmenting device 530 is a goggles device or glasses device which can be worn in front of a user's eyes. For example, the shown portion of the device 530 can be one of the eyepieces of the device, with another similar portion to the left of the shown portion. A field of view 532 of the augmenting device 530 is shown, which is the view provided to a user wearing the device 530. In some implementations, the field of view 532 is viewed directly through a layer of glass, plastic, or other transparent material. In other implementations, the field of view 532 can be provided by a display screen located in front of the user's eye and displaying images of physical locations. Other types of augmenting devices can be used in other implementations, such as a cell phone, tablet computer, laptop computer, or other device with a camera (e.g., on one side of the device) and a display screen (e.g., on the other side) that shows the field of view of the camera.

In this example, the physical display screen 502 is seen as an image 540 in the field of view 532 in response to the user who is wearing the augmenting device 530 moving his or her head (and the device 530) to look at the display screen 502. The augmenting device 540 can detect the display screen in its field of view 532 after the motion of the field of view has settled down, and by looking for the rectangular shape of the screen as well as looking for the highlight markers 512 that indicate the extents of the screen 502. Other features or objects surrounding the display screen and present at the physical location may also be seen in the field of view 532, but these are omitted here for clarity.

The augmenting device also has detected the code 520 in the visual output 504 of the display screen, where the code is captured as a code image 542 provided in the field of view 532. The device decodes the code image 542 to retrieve the descriptive information and screen positions listed above. The device then displays the retrieved descriptors as overlaid graphical descriptors 544 in the field of view 532 at the screen positions included in the code image 542. The device 530 can display the descriptors in the field of view 532 in a predetermined arrangement with respect to each other. In this example, the descriptors 544 are displayed in boxes 546 which can include a pointer 548 for pointing to the depicted person image 550 (corresponding to persons 510) or other object to which they refer. For example, the center of the boxes 546 can be displayed at the extracted screen positions. The augmenting device can display extracted information and graphics anywhere within its field of view 523, even outside the boundaries of the display screen. For example, the descriptor and box for "David B." is displayed partially outside the boundaries of the visual output of the display screen 540 as seen in the field of view 532 to allow that descriptor to maintain a readable size. In some implementations, the system 508 can provide screen positions in the code 520 outside the boundaries of the screen in the information pattern, where the system 508 can estimate the screen position using the same coordinate system as used for the screen's visual output, e.g., extending the coordinate system outside the screen.

The augmenting device can also include one or more microphones 550 (or other sound-receiving devices) which are operative to detect sound signals, such as the audio output from speakers 506. The microphones 550 are also sensitive to an audio information pattern that is output by system 508, allowing the augmenting device 530 to receive and decode the audio information pattern. For example, the augmenting device can periodically check for the audio information pattern, and/or can continuously check for the audio pattern under particular conditions, e.g., if a display screen is detected in the field of view 532.

Figure 6:
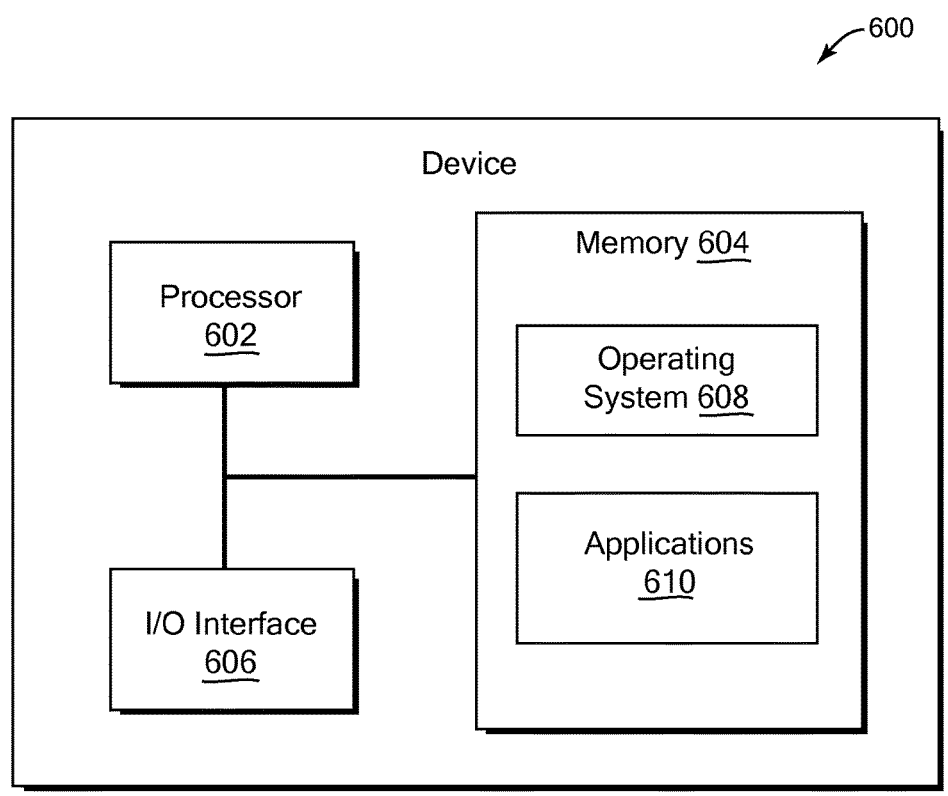
FIG. 6 is a block diagram of an example device which may be used for one or more implementations described herein.

FIG. 6 is a block diagram of an example device 600 which may be used to implement one or more features described herein. For example, device 600 can be an augmenting device 132 or 134 as shown in FIG. 1. Device 600 can be any suitable computer system or other electronic or hardware device. In some implementations, device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the device 600 by the processor 602, including an operating system 608 and one or more applications engines 610 such as a media display engine, videoconferencing engine, communications engine, etc. In some implementations, the applications engines 610 can include instructions that enable processor 602 to perform functions described herein, e.g., some or all of the methods of FIGS. 2 and 3. Any of software in memory 604 can alternatively be stored on any other suitable storage location or computer-readable medium. In addition, memory 604 (and/or other connected storage device(s)) can store data describing how to display descriptive information and other displayable information, database information, and other data used in the features described herein. Memory 604 and any other type of storage (magnetic disk, optical disk, magnetic tape, or other tangible media) can be considered "storage devices."

I/O interface 606 can provide functions to enable interfacing the device 600 with other systems and devices. In some implementations, the I/O interface connects to interface components or devices (not shown) such as input devices, including one or more cameras and microphones, in some implementations, additional devices (e.g., keyboard, pointing device, touchscreen, scanner, etc.). The I/O interface also connects to output components or devices, including one or more display devices (e.g., such as an LCD, LED, or plasma display screen, CRT, television, monitor, touchscreen, 3-D display screen, or other visual display) and speaker devices, and in some implementations, additional devices (printer, motors, etc.). For example, network communication devices, storage devices such as memory and/or database 106, and input/output devices can communicate via interface 606.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While device 600 is described as performing steps as described in some implementations herein, any suitable component or combination of components of device 600 or similar system, or any suitable processor or processors associated with such a system, may perform the steps described.

A server device can also implement and/or be used with features described herein, such as server system 102 shown in FIG. 1. For example, a system implementing method 300 of FIG. 3 can be any suitable system implemented similarly as device 600. In some examples, the system can take the form of a mainframe computer, desktop computer, workstation, portable computer, or electronic device (portable device, cell phone, smart phone, tablet computer, television, TV set top box, personal digital assistant (PDA), media player, game device, etc.). Such a system can include some similar components as the device 600, such as processor(s) 602, memory 604, I/O interface 606, and applications engines 610. An operating system, software and applications suitable for the system can be provided in memory and used by the processor, such as client group communication application software, media presentation software, face and object recognition software, etc. The I/O interface for the system can be connected to network communication devices, as well as to input and output devices such as a microphone for capturing sound, a camera for capturing images or video, audio speaker devices for outputting sound, a display device for outputting images or video, or other output devices. A connected display device, for example, can be used to display visual output and controllable features as described herein, where such display device can include any suitable display similarly as described above. Some implementations can provide an audio output device, such as voice output or synthesis that speaks text and/or describes preferences.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   detecting visual output of a physical display screen appearing in a field of view of an augmenting device, the visual output depicting two or more objects;
   detecting a visual information pattern in the visual output;
   extracting descriptive information embedded in the visual information pattern, wherein the descriptive information is associated with respective ones of the two or more objects depicted in the visual output; wherein the descriptive information includes two or more sets of descriptors, wherein each set of the two or more sets of descriptors is associated with at least one respective object of two or more objects depicted on the physical display screen;
   extracting screen position information from the visual information pattern, wherein the screen position information is associated with the descriptive information and indicates one or more screen positions on the physical display screen, the one or more screen positions based, at least in part, on positions of the respective ones of the two or more objects, and each of the one or more screen positions being associated with a different set of two or more sets of descriptors; and
   causing a display of the descriptive information overlaid in the field of view of the augmenting device, wherein the display is based on the position of the display screen in the field of view and is based on the screen position information, wherein the displayed descriptive information is visually associated with the respective ones of the two or more objects.

2. The method of claim 1, wherein at least a portion of the descriptive information is displayed in a position outside of a boundary of the display screen in the field of view of the augmenting device.

3. A method comprising:
   detecting a physical display screen appearing in a field of view of an augmenting device;
   detecting an information pattern in an output associated with the physical display screen;
   extracting displayable information from the information pattern, wherein the displayable information includes two or more descriptors, wherein individual descriptors or sets of descriptors of the two or more descriptors are associated with at least one respective object of two or more objects depicted on the physical display screen;
   extracting screen position information from the information pattern, wherein the screen position information is associated with the displayable information and indicates a screen positions on the physical display screen based, at least in part, on a position of respective ones of the two or more objects depicted in the output; and
   causing a display of the displayable information overlaid in the field of view of the augmenting device, wherein the display of the displayable information is based on the screen position information.

4. The method of claim 3 wherein the output associated with the physical display screen is visual output and the information pattern is a visual information pattern provided in the visual output.

5. The method of claim 4 wherein the visual output is one of:
   a video stream displayed by the physical display screen, and
   an image displayed by the physical display screen.

6. The method of claim 4 wherein the visual output includes a live video stream displayed by the physical display screen and the two or more objects are two or more persons participating in a video conference.

7. The method of claim 4 further comprising receiving additional displayable information via one or more signals separate from the visual output of the physical display screen.

8. The method of claim 3 wherein the displayable information includes identifying information indicating identities of the two or more objects.

9. The method of claim 3 wherein detecting the physical display screen includes detecting one or more highlight markers displayed in the output of the display screen, wherein the one or more highlight markers highlight the output to assist the detection of the physical display screen in the field of view of the augmenting device.

10. The method of claim 3 wherein the screen position information includes screen coordinates indicating a location on the display screen with reference to one or more display screen boundaries.

11. The method of claim 3 wherein the augmenting device includes a wearable device or a handheld device and the displayable information is displayed as augmented reality graphics overlaid in the field of view.

12. The method of claim 3, further comprising determining availability information of an area indicated by the screen position information and wherein the display of the displayable information is further based on the availability information.

13. The method of claim 3, wherein the screen position information is further based on at least one of a predetermined distance and direction for the individual descriptors with reference to the at least one respective object of the two or more objects.

14. The method of claim 3, wherein at least a portion of the displayable information is displayed in a position outside of a boundary of the display screen in the field of view of the augmenting device.

15. A system comprising:
   a storage device; and
   at least one processor accessing the storage device and operative to perform operations comprising:
   detecting a physical display screen appearing in a field of view of an augmenting device;
   detecting an information pattern in output associated with the physical display screen;
   extracting displayable information from the information pattern, wherein the displayable information includes two or more descriptors, wherein individual descriptors or sets of descriptors of the two or more descriptors are associated with at least one respective object of two or more objects depicted on the physical display screen;

extracting screen position information from the information pattern, wherein the screen position information is associated with the displayable information and indicates screen positions on the physical display screen based, at least in part, on a position of respective ones of two or more objects depicted in the output; and causing a display of the displayable information overlaid in the field of view of the augmenting device, wherein the display of the displayable information is based on the screen position.

16. The system of claim 15 wherein the output associated with the physical display screen is visual output and the information pattern is a visual information pattern provided in the visual output.

17. The system of claim 15 wherein detecting a physical display screen includes detecting one or more highlight markers displayed in the output of the physical display screen, wherein the one or more highlight markers highlight the output to assist the detection of the physical display screen in the field of view of the augmenting device.

18. The system of claim 15, wherein the operations further comprise determining availability information of an area indicated by the screen position information and wherein the display of the displayable information is further based on the availability information.

19. The system of claim 15, wherein the screen position information is further based on at least one of a predetermined distance and direction for the individual descriptors with reference to the at least one respective object of the two or more objects.

* * * * *